July 28, 1936.   S. J. NORDSTROM   2,048,884
VALVE
Original Filed Jan. 18, 1932   4 Sheets-Sheet 2
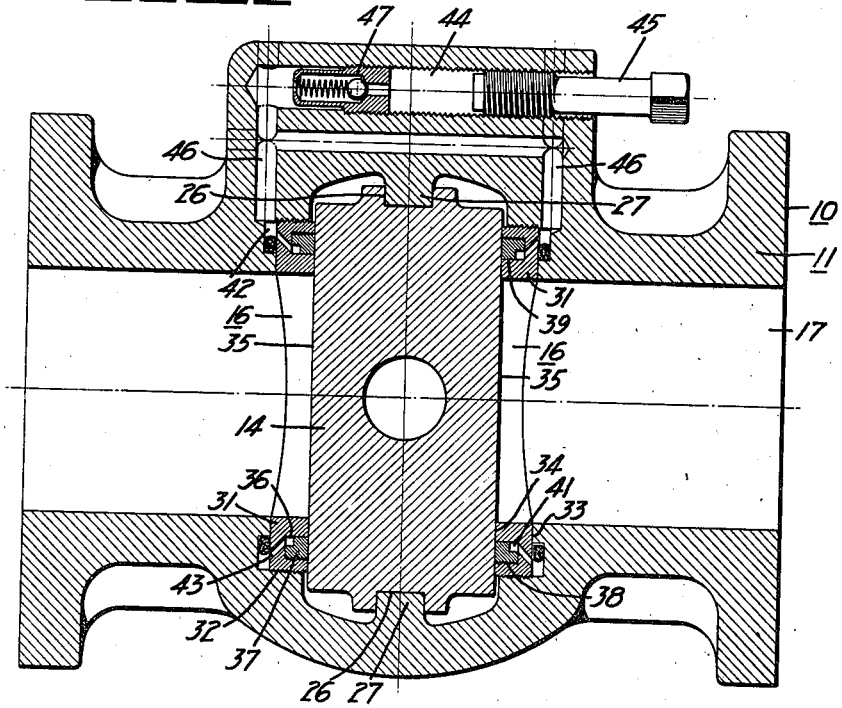
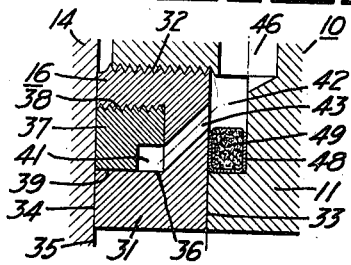
INVENTOR.
Sven J. Nordstrom
BY
White, Prost, Fish & Lothrop
ATTORNEYS.

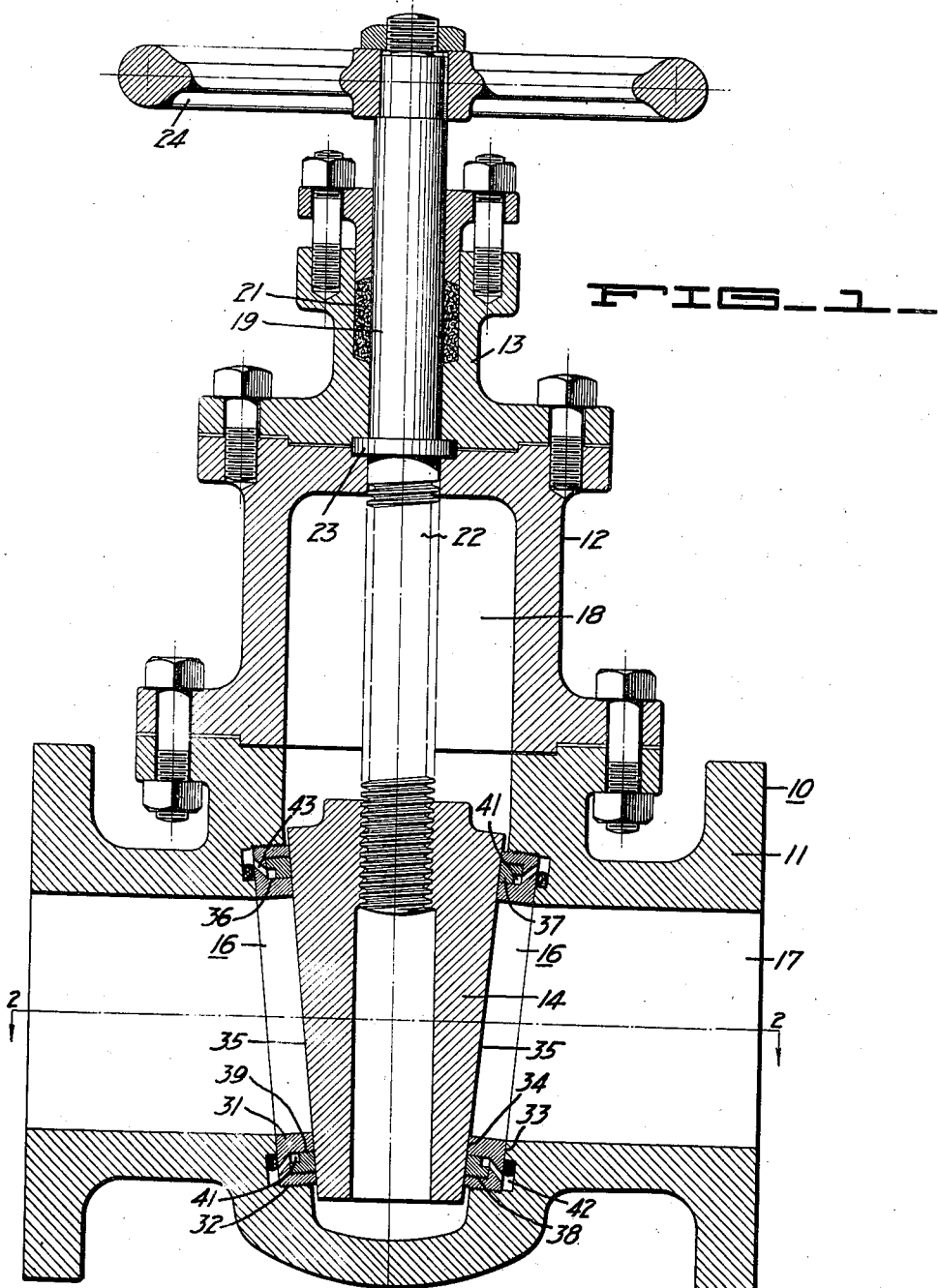

July 28, 1936.  S. J. NORDSTROM  2,048,884
VALVE
Original Filed Jan. 18, 1932   4 Sheets-Sheet 3
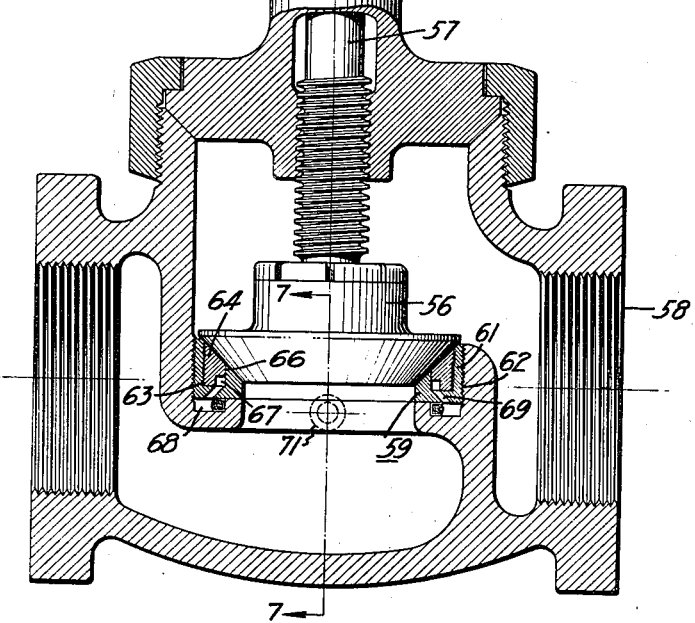
FIG_6_
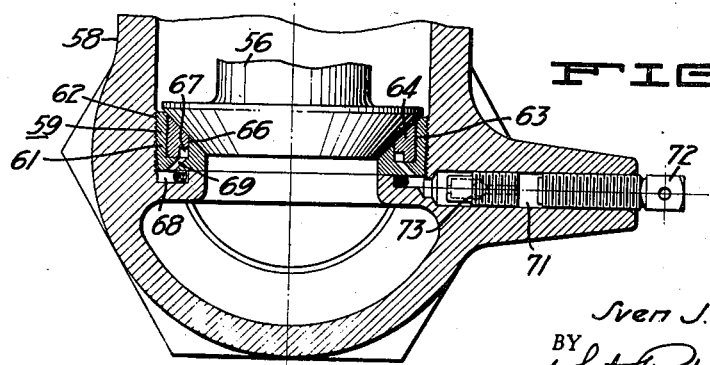
FIG_7_
INVENTOR.
Sven J. Nordstrom
BY
White, Prost, Fehr & Lothrop
ATTORNEYS.

July 28, 1936.                S. J. NORDSTROM                2,048,884
                                   VALVE
                    Original Filed Jan. 18, 1932    4 Sheets—Sheet 4
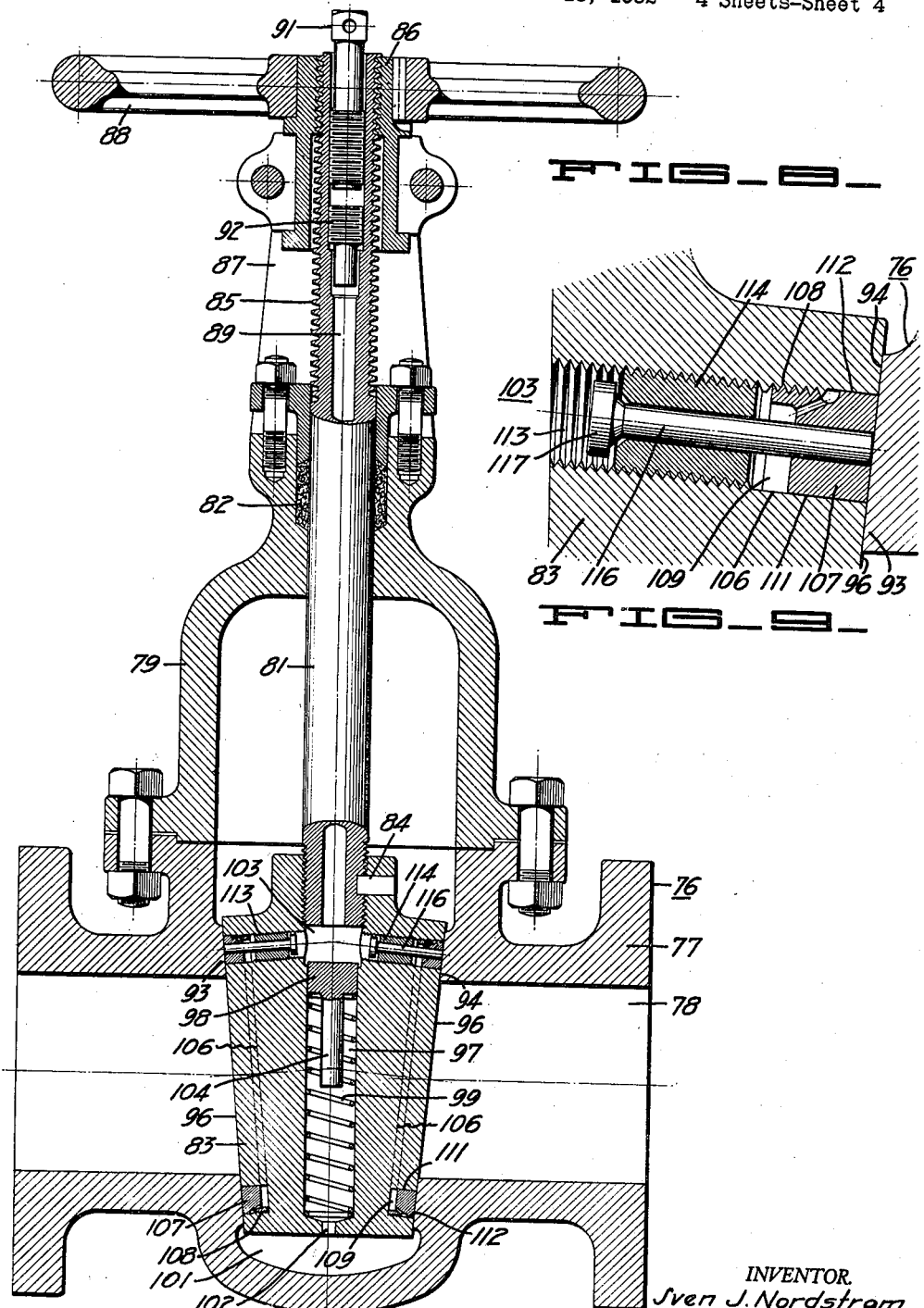
FIG_8_
FIG_9_
INVENTOR.
Sven J. Nordstrom
BY
White, Prest, Fletcher Lothrop
ATTORNEYS.

Patented July 28, 1936

2,048,884

UNITED STATES PATENT OFFICE 2,048,884

VALVE

Sven Johan Nordstrom, Piedmont, Calif., assignor to Merco Nordstrom Valve Company, San Francisco, Calif., a corporation of Delaware Application January 18, 1932, Serial No. 587,179
Renewed October 15, 1935

14 Claims. (Cl. 251—167)

This invention relates generally to valves for controlling flow of fluid, particularly valves utilizing means for supplying lubricant under pressure to the valve working surfaces.

As heretofore constructed, the exposed lubricant grooves employed in lubricating the seating surfaces of valves will catch sediment, grit, scale and other foreign matter which is held by the lubricant, and when the valve is closed, this grit is caught between the sealing surfaces thereby preventing proper seating thereof and causing scoring of the surfaces. The lubricant channels heretofore employed have a width at the area of contact of the sealing surfaces of about ⅛ to ⅜ of an inch, and consequently, when these channels are exposed to line fluid the lubricant will be easily washed therefrom, resulting in waste of lubricant, and solid matter will accumulate in the washed out lubricant cavities or grooves and cause abrasion and scoring of the valve sealing surfaces each time the valve is closed.

In my copending application, Serial No. 584,634, filed January 4, 1932, I disclose and claim a valve construction having a floating ring in the valve surface providing a narrow lubricant groove for lubricating and sealing the valve seat. According to the present invention, I provide lubricant grooves by relatively fixed members in the sealing surface of a valve, which grooves are of insufficient width to cause detrimental accumulation of solid materials therein, and from which lubricant will not easily be removed by line fluid. I employ lubricant grooves having a width in the area of contact of the valve and seat of about one thousandth to thirty-one thousandths of an inch, and preferably a width of one thousandth to five thousandths of an inch. Grooves approaching the smaller limits of my invention are provided preferably by two separate elements in one of the working surfaces of the valve, fixed with respect to each other and being accurately machined to provide a slit of the desired width therebetween. Thus, both elements at all times lie in the plane of the valve working surface. By the term "valve working surface" it will be understood that I mean either the surface of the seat or the surface of the movable valve member, as these parts theoretically form one surface in closed position.

The small size of the lubricant groove in the working surface reduces the loss of lubricant washed out by line fluid and under certain conditions no disconnection of the grooves from the source of lubricant pressure is required. However, I provide a cut off which may be employed where the advantages thereof warrant the additional cost of manufacture.

In a preferred embodiment, my invention is applied to a wedge type gate valve by threading a ring into a recess in the gate seat, and threading a second ring into a recess provided in said first ring, thus providing separate interfitted elements, the rings being machined to provide a slit of about one to five thousandths of an inch therebetween. After being inserted in place, the rings are not movable with respect to each other and both rings become part or all of the seat of the valve. Lubricant is supplied to the slit between the rings from a suitably located reservoir, a screw or other pressure means being provided to force lubricant through the slit.

It is an object of the invention to devise a pressure lubricated valve in which the lubricant distributing channels will not tend to cause detrimental accumulation of solid materials from the line fluid on the valve working surfaces.

It is a further object of the invention to devise a valve of the above character which will effect utmost economy in the use of lubricant, and which will obviate the necessity of providing cut-off between certain channels for certain positions of the movable valve member.

It is a further object of the invention to devise a valve construction which will enable use of relatively narrow slits or channels for applying viscous lubricant to the valve working surfaces, and which can be successfully manufactured without undue cost.

Further objects of the invention will appear from the following description, in which the preferred embodiments of the invention have been set forth in detail in conjunction with the accompanying drawings. The appended claims are to be accorded a range of equivalents consistent with the state of the prior art.

Referring to the drawings:

Fig. 1 is a side elevational view in transverse cross section, illustrating a valve of the gate type incorporating the present invention.

Fig. 2 is a cross sectional view taken along the line 2—2 of Fig. 1.

Fig. 3 is an enlarged cross sectional detail, illustrating the construction of the seat employed in the valve of Figs. 1 and 2.

Figs. 4 and 5 are views similar to Fig. 3, but illustrating further possible modifications in seat constructions.

Fig. 6 is a side elevational view, in transverse cross section, illustrating a valve of the globe type incorporating the present invention.

Fig. 7 is a cross sectional view taken along the line 7—7 of Fig. 6.

Fig. 8 is a side elevational view, in transverse cross section, illustrating a further modification of the invention in a valve of the gate type.

Fig. 9 is an enlarged cross sectional detail, illustrating a portion of the gate incorporated in the modification of Fig. 8.

Referring to Fig. 1, the valve illustrated therein consists of a casing 10, which for convenience in manufacture and assembly is shown formed of three parts, numbered 11, 12, and 13, respectively. Slidably disposed within the casing 10 there is a valve member 14, illustrated as being in the form of a tapered or wedge-shaped gate. Gate 14 is adapted to cooperate with a pair of stationary valve seats 16, shown in the drawings as a pair of inserted rings which are mounted within the casing in such a manner as to surround the main fluid passageway 17. In open position gate 14 is accommodated within a chamber 18, formed principally by the intermediate casing part 12. Gate 14 is adapted to be moved between open and closed positions by a rotatable valve stem 19, which is journalled in the upper casing part 13, and which is packed by a suitable packing 21. The inner portion 22 of stem 19 has a threaded engagement with gate 14. Longitudinal movement of stem 19 is prevented by suitable means such as a shoulder 23, which is part of the stem and which engages a recess formed in the casing. Hand wheel 24 is shown fixed to the outer end of stem 19 to facilitate manual rotation. In order to properly guide gate 14 in its movement between open and closed positions it is shown provided with parallel grooves 26 (Fig. 2) which receive parallel guides 27 formed within the casing.

The pressure lubricating system for the valve includes a novel construction for the valve seats 16. Each of these seats has been illustrated as formed of an annular member 31, made of suitable material such as a non-corrodible metal alloy. Each member 31 has a threaded engagement as indicated at 32, with the main part 11 of the valve casing. One face of each member is shown provided with an abutting contact with a shoulder formed on the valve casing, as indicated at 33. The other face of each member 31 is suitably machined to form a valve working surface 34, to cooperate with the corresponding valve working surface 35 formed upon the gate 14. Each member 31 is likewise provided with a groove 36, and in the preferred form of the invention, this groove is circular in contour, or the same contour as member 31. Mounted within groove 36 there is a ring 37 made of suitable material, such as a non-corrodible metal alloy. A convenient manner of mounting each ring 37 with its corresponding member 31, is to provide a threaded engagement between one of the peripheral surfaces of ring 37 and a corresponding side wall of groove 36. Thus in the modification of Figs. 1 to 3 inclusive, a threaded engagement 38 is formed between the outer peripheral portion of ring 37, and the adjacent side wall of groove 36. The outer face of ring 37 is preferably machined so as to have its outer face coextensive with the outer face of member 31, thus forming a portion of the valve working surface 34. The inner periphery of ring 37 and the adjacent side walls of grooves 36 are likewise preferably machined, and the proportioning is such that between these machined surfaces there is formed a circular slit or clearance 39.

In order to supply viscous lubricant under pressure through clearance 39 to the valve working surfaces, ring 37 is shown recessed to form a circular lubricant feed duct 41, of enlarged dimensions. Formed within the casing part 11, there is likewise an annular recess forming an annular lubricant chamber 42, which is in communication with duct 41 through a plurality of connecting ducts 43.

To supply viscous lubricant under pressure to both of the annular chambers 42, Fig. 2 illustrates a bore 44 formed in the valve casing part 11, which is threaded to receive the lubricant pressure screw 45. Passages or ducts 46 serve to connect the inner end of bore 44, with both the annular chambers 42. A check valve 47 is shown mounted in bore 44, to prevent back flow of lubricant.

With the structure described above, there is a possibility that the contact areas 33 may not afford an absolute seal, and may thus permit leakage of lubricant from chambers 42. To afford a positive seal at this point, suitable sealing means has been illustrated, consisting for example of an annular member 48 formed of sheet metal, and bent to be U-shaped in cross section. A compressed filler 49, of suitable material such as asbestos fiber, insures pressing of the side faces of member 48 against the adjacent machined surfaces of member 31 and the valve casing, to afford a positive seal.

Before explaining the operation of the valve it may be noted that the lubricant employed is preferably of highly viscous character, such as is ordinarily employed in lubricated valves, and which is available upon the market in stick form. Assuming now that the valve gate 14 is in closed position and that viscous lubricant has been inserted in bore 44, turning down of screw 45 causes the lubricant to flow through ducts 46, into the annular chambers 42. From annular chambers 42 the lubricant flows through ducts 43, to the annular feed ducts 41. Further turning down of lubricant screw 45 causes sufficient lubricant pressure to be built up to cause the viscous lubricant to be extruded through clearances 39 to the valve working surfaces. Since clearances 39 are circular, the lubricant thus extruded is supplied to the areas of contact between the valve working surfaces, along zones surrounding the passage 17 through the valve casing. Therefore the valve will be adequately sealed against leakage past the gate.

With the present invention the clearances indicated at 39 through which viscous lubricant is caused to extrude, are of insufficient width to cause detrimental accumulation of such solid materials, and therefore the condition of the valve working surfaces will be conducive to proper sealing contact. Likewise the nature of clearances 39 as compared to relatively wide channels, obviates washing away and wastage of large amounts of lubricant. The relatively thin ribbons of lubricant existing in clearances 39 tend to remain intact, due to the viscosity of the lubricant, and there will be substantially no tendency for swirling currents of line fluid to penetrate and wash out the lubricant. In the preferred embodiment each of the clearances 39 constitutes an elongated lubricant channel having a width in the area of contact sufficiently small to prevent detrimental accumulation of foreign material from the line therein. This width preferably is about five thousandths of an inch, although I do not wish to be confined to this limit, which is exemplary, in claiming my invention.

A further characteristic inherent in the use of clearances 39, as distinguished from relatively wide lubricant channels, is that extrusion of viscous lubricant therethrough requires a relatively high pressure to be built up in feed ducts 41, and thus lubricant will not tend to flow to the valve working surfaces along a localized area, but will tend to flow throughout the lengths of clearances 39. In other words each of the clearances 39 acts as a pressure attenuating channel, to which viscous lubricant is supplied throughout its entire length.

The two part construction for the seats 16 makes possible the formation of relatively narrow slits or clearances 39, in the order of say, five thousandths of an inch, in a manner applicable to commercial production.

It has been mentioned that when the valve gate is in closed position the operator can extrude lubricant under pressure to the valve working surfaces, by turning down screw 45. After the gate has remained open for a considerable period, it may also be desirable for the operator to first turn down screw 45 to extrude a certain amount of lubricant through clearances 39, so that the valve working surfaces of the seat are supplied with lubricant at the time the gate is closed. In this connection it should be noted that in the modification just described the clearances 39 are at all times in communication with a source of lubricant which can be placed under high pressure. In other words when the valve gate is moved to open position, and the faces of the valve seats are exposed to line fluid, there is no cut-off effected between clearances 39 and the source of lubricant. Such cut-off is not essential in the present valve, due to the fact that the pressure attenuation effected by clearances 39 precludes the possibility of extrusion of large amounts of lubricant through these clearances when the valve is open, but may be employed if desired.

It is evident that the width of clearances 39 can be varied within the scope of the invention. In general good results can be secured by clearances varying from say one to five thousandths of an inch. Greater clearances can be employed, as for example 1/32nd of an inch, although in this event the pressure attenuating characteristics of these clearances will not be pronounced.

In the modified seat construction illustrated in Fig. 4, two concentric clearances are provided for extrusion of lubricant. In this case only a portion of each ring 37a is threaded, to afford a threaded connection 38a with member 31a, while the remainder of the outer periphery of each ring is machined to form a clearance 40. The outer periphery of ring 37a is also provided with a circumferential groove 51, communicating with clearance 40, and also communicating with feed duct 41 through a plurality of spaced ducts 52. When viscous lubricant is supplied to feed duct 41 under pressure, viscous lubricant is caused to be extruded through both the circular clearances 39a and 40.

In the modification illustrated in Fig. 5, a part of the valve seat is integral with the valve casing. Thus in this case the valve casing is counterbored to receive a ring 37b, corresponding to the ring 37 of Fig. 3 which is threadedly secured thereto as indicated at 38b. A clearance 39b, through which viscous lubricant can be extruded, is formed between an outer machined peripheral surface of ring 37b, and an adjacent inner peripheral machined surface formed on the valve body. A circular feed duct 53 formed in the valve body, communicates throughout its length with clearance 39b, and is in communication with chamber 42b, through the spaced ducts 54.

In Figs. 6 and 7, there is shown a valve of the globe type incorporating a seat construction similar to that illustrated with respect to Figs. 1 to 5 inclusive. In this case the valve member 56, in the form of a disk having a conical shaped valve working surface, is secured to the inner end of an operating stem 57. Positioned within the valve body 58, there is a seat construction 59, likewise having a conical valve working surface adapted to contact with the working surface of valve member 56. Seat construction 59 consists of an annular member 61, fixed within the valve body as by means of threaded connection 62. Fixed within member 61, as by means of threaded connection 63, there is a ring 64, corresponding to ring 37 of Fig. 3. A circular clearance 66, through which viscous lubricant can be extruded, is formed between adjacent machined surfaces of members 61 and 64, and corresponds to the clearance 39 of Fig. 3. The outer face of ring 64 is likewise conical shaped, so as to form in effect a part of the stationary valve working surface. An annular feed duct 67 communicates with clearance 66, and is in turn in communication with annular lubricant chamber 68, through spaced ducts 69. To introduce viscous lubricant under pressure into annular chamber 68, there is shown a bore 71, threaded to receive the lubricant pressure screw 72. A check valve 73 is shown mounted in bore 71, to prevent back flow of lubricant.

Operation of the valve illustrated in Figs. 6 and 7, is substantially the same as that previously described with reference to Figs. 1 to 3 inclusive. With the valve member 56 in closed position, lubricant under pressure can be extruded through clearance 66 to the valve working surfaces, by turning down screw 72.

The valve illustrated in Figs. 8 and 9 is of the gate type, but differs from that illustrated in Figs. 1 to 3 inclusive, in that means is provided for continuously maintaining a charge of lubricant within the same under pressure. The valve in this instance includes a casing 76, formed of the main part 77 provided with a fluid passageway 78, and an upper part 79. The valve stem 81 extends through casing part 79, and is sealed by suitable packing 82. The lower end of stem 81 is shown locked to the gate 83, by a threaded connection and by lock pin 84. The outer end of stem 81 is provided with a threaded portion 85 engaged by a rotatable nut 86. Nut 86 is journaled in a standard 87 mounted upon the casing, and is engaged by suitable means such as a hand wheel 88.

The lubricant in this instance is introduced through stem 81, and therefore this stem is shown provided with a central bore or passageway 89. The upper end of bore 89 is threaded to receive a lubricant pressure screw 91, and to also receive a check valve 92 to prevent back flow of lubricant. The seats employed with the valve of Figs. 8 and 9 are designated at 93, and are integral with the main casing part 77. The valve working surfaces of these seats are indicated at 94 and the cooperating valve working surfaces of gate 83 are indicated at 96.

Extending longitudinally of gate 83 and aligned with stem 81, there is a bore 97 forming the equivalent of a cylinder. Piston 98 is fitted within cylinder 97, and is urged in one direction by compression spring 99. Bore or cylinder 97, below piston 98, is in communication with well 101, at the bottom of gate 83, through port 102. Thus assuming that fluid in the well 101 is at line pressure, line pressure is always impressed upon the under side of piston 98. The upper end of cylinder 97 communicates with a chamber 103, which is likewise in communication with the lower end of the bore or passageway 89. Depending portion 104, secured to piston 98, serves to definitely limit movement of the piston in one direction.

Formed within both the opposite faces of gate 83, are the annular grooves 106, corresponding to the grooves 36 of Fig. 3. Mounted within these grooves are the annular metal rings 107, which are shown fixed to the gate by means of threaded connections 108, and which have their inner faces recessed to form annular feed ducts 109. Adjacent machined surfaces between the gate and rings 107, serve to form the clearances 111 and 112, through which viscous lubricant can be extruded. Within the upper portion of gate 83, threaded openings 113 communicate between chamber 103 and the upper portions of feed ducts 109.

In order to avoid continuous extrusion of lubricant through the clearances 111 and 112, when the gate is in open position, lubricant flow control means is utilized such as illustrated in Fig. 9. This control means includes a collar 114 threaded within each of the openings 113, and adapted to slidably receive a pin 116. The outer end of each pin 116 extends through an aperture formed in the corresponding ring 107, while the inner end of each pin is shown provided with a head 117. When the gate is in closed position each pin 116 is forced inwardly to the position illustrated in Fig. 9, by virtue of engagement with the valve working surface of the adjacent stationary seat 93. In this position lubricant under pressure can extrude through the clearance between the pin and collar 114, to the corresponding annular feed duct 109. When the valve is opened each of the pins 116 is moved outwardly by virtue of the lubricant pressure upon the same, to bring the head 117 into contact with the inner face of collar 114. In such position communication between chamber 103 and feed ducts 109, is interrupted, and no further extrusion of lubricant can occur through clearances 111 and 112.

In operating the valve of Figs. 8 and 9, the operator first introduces a sufficiently large charge of viscous lubricant into the valve by way of bore 89, to force piston 98 downwardly against the compression spring 99. If the valve is now in open position, no flow of lubricant can occur to the feed ducts 109 as pins 116 are in closed position. If the valve is now closed, pins 116 are forced inwardly, to permit lubricant from chamber 103 to flow through collars 114 to feed ducts 109 and from thence through clearances 111 and 112 to the valve working surfaces. In the event it is desired to subject the lubricant in the system to a higher pressure than can be maintained by piston 98, the operator introduces a sufficient amount of viscous lubricant through bore 89 to force piston 98 downwardly to the limit of its movement. Thereafter an extremely high pressure can be built up in the system by further turning down of screw 91.

I claim:

1. In a valve, two relatively movable parts having cooperating valve working surfaces, the valve working surfaces of one of said parts being defined by the faces of two separate interfitted elements fixed with respect to each other, there being a slit formed between said element through which viscous lubricant can be extruded.

2. In a valve, two relatively movable parts having cooperating valve working surfaces, the valve working surfaces of one of said parts being defined by the faces of two separate interfitted elements fixed with respect to each other, there being an elongated slit formed between said elements through which viscous lubricant can be extruded, and means for supplying viscous lubricant under pressure to said slit.

3. In a valve, two relatively movable parts having cooperating valve working surfaces, the valve working surface of one of said parts being defined by the faces of two separate interfitted metallic elements fixed with respect to each other, there being a slit formed between opposed machined surfaces of said elements, and means for causing viscous lubricant to be extruded through said slit to the valve working surfaces.

4. In a valve, two relatively movable parts having cooperating valve working surfaces, the valve working surface of one of said parts being defined by the faces of two separate metallic elements fixed with respect to each other, said elements having a threaded engagement with each other, there being a slit formed between said elements, and means for causing viscous lubricant to be extruded through said slit to the valve working surfaces.

5. In a valve, two relatively movable parts having cooperating valve working surfaces, the valve working surface of one part being defined by the face of a ring and also by the face of another element interfitted therewith, said ring and element being fixed with respect to each other and forming between them a circular slit through which viscous lubricant can be extruded.

6. In a valve, two relatively movable parts having cooperating valve working surfaces, the valve working surface of one part being defined by the face of a ring and by the face of another element interfitted therewith, said ring and element being fixed with respect to each other, there being a narrow circular slit formed between adjacent opposed surfaces of the same through which viscous lubricant can be extruded, and means for forcing viscous lubricant through said slit to the valve working surfaces.

7. In a valve, two relatively movable parts having cooperating valve working surfaces, the valve working surface of one part being defined by the face of a ring and also by the face of another element, said ring and element having a threaded engagement with each other, there being a narrow circular slit formed between adjacent opposed surfaces of the same through which viscous lubricant can be extruded.

8. In a valve, two relatively movable parts having cooperating valve working surfaces, one of said parts having a passageway therethrough for flow of fluid, said valve working surfaces being adapted to meet along an area of contact surrounding said passageway, the valve working surface of one part being defined by the face of a ring and also by the face of another element interfitted therewith, said ring and element being fixed with respect to each other, there being a narrow circular slit formed between adjacent opposed surfaces of said ring and said element through which viscous lubricant can be extruded to the valve working surfaces, said slit being arranged to surround said passageway.

9. In a valve, two relatively movable parts having valve working surfaces, one of said parts being formed of two separate interfitted elements fixed with respect to each other and forming between them a slit through which viscous lubricant can be extruded to the valve working surfaces, a chamber formed within the valve adapted to receive a charge of lubricant, said chamber being adapted to be placed in communication with said slit, and means for maintaining the lubricant in said chamber under pressure.

10. In a valve, a casing having a passageway therethrough, a ring surrounding said passageway and threaded into said casing to provide a seat, a clearance or slit being provided between said ring and casing, means to extrude lubricant under pressure through said slit, and a closure adapted to seat on said ring.

11. In a valve having separable valve working surfaces, a casing having a passageway therethrough, a ring surrounding said passageway and threaded into said casing to provide a seat and forming a lubricant chamber therebetween, means to prevent leakage of lubricant from the chamber to the passageway, an insert ring threaded into said first ring and providing a slit therebetween, a passageway being provided through said rings between said slit and lubricant chamber, a closure adapted to seat on said rings, and means to supply lubricant under pressure to said chamber.

12. In a valve, two relatively movable parts having valve working surfaces, one of said parts being in the form of a seat and the other being in the form of a movable valve member adapted to be advanced upon the seat, one of said parts being formed of two separate elements fixed with respect to each other and forming between them a slit through which lubricant can be extruded to the valve working surfaces, a chamber formed within the valve adapted to receive a charge of lubricant, means serving to control communication between said chamber and said slit in accordance with the position of the movable valve member, and means for maintaining lubricant in said chamber under pressure.

13. In a valve, a lubricant chamber, means to supply lubricant under pressure to said chamber, two relatively movable parts having valve working surfaces, one of said parts being in the form of a seat and the other being in the form of a movable valve member adapted to be advanced upon the seat, one of said parts being formed of two separate elements fixed with respect to each other and forming between them a slit through which lubricant can be extruded from said chamber to the valve working surfaces, and means on one of the parts extended beyond the valve working surfaces and adapted to engage the other of said parts to open communication between said lubricant chamber and slit.

14. In a valve, a lubricant chamber, means to supply lubricant under pressure to said chamber, two relatively movable parts having valve working surfaces, one of said parts being in the form of a seat and the other having a fixed insert providing a slit communicating with said lubricant chamber, and a plurality of pins extending through openings in said insert into said lubricant chamber adapted to close communication through said openings between said slit and chamber when the said parts are separated, said pins being arranged to be moved by one of said working surfaces as the said parts are brought into engagement to a position permitting passage of lubricant through said slit.

SVEN JOHAN NORDSTROM.